United States Patent
Kashani et al.

(10) Patent No.: US 12,267,351 B2
(45) Date of Patent: Apr. 1, 2025

(54) SYSTEM AND METHOD FOR DYNAMICALLY UPDATING FIREWALL RULES FOR A VEHICLE NETWORK OF A VEHICLE

(71) Applicant: Denso Corporation, Kariya (JP)

(72) Inventors: Ameer Kashani, Southfield, MI (US); Carlos Mora-Golding, Southfield, MI (US)

(73) Assignee: Denso Corporation, Kariya (JP)

( * ) Notice: Subject to any disclaimer, the term of this patent is extended or adjusted under 35 U.S.C. 154(b) by 145 days.

(21) Appl. No.: 17/960,311

(22) Filed: Oct. 5, 2022

(65) Prior Publication Data
US 2024/0121258 A1   Apr. 11, 2024

(51) Int. Cl.
*H04L 9/40*   (2022.01)
*G07C 5/00*   (2006.01)

(52) U.S. Cl.
CPC .......... *H04L 63/1433* (2013.01); *G07C 5/008* (2013.01); *H04L 63/0263* (2013.01)

(58) Field of Classification Search
CPC ............. H04L 63/1433; H04L 63/0263; H04L 63/1425; H04L 63/20; G07C 5/008
See application file for complete search history.

(56) References Cited

U.S. PATENT DOCUMENTS

| | | | | |
|---|---|---|---|---|
| 8,397,282 | B2 * | 3/2013 | Turley | H04L 63/0263 726/11 |
| 8,848,608 | B1 * | 9/2014 | Addepalli | H04W 8/26 370/401 |
| 10,764,134 | B2 * | 9/2020 | Barrett | H04L 63/0263 |
| 2004/0250124 | A1 * | 12/2004 | Chesla | G06F 21/552 709/224 |
| 2008/0148380 | A1 * | 6/2008 | Abzarian | H04L 63/0263 713/153 |
| 2013/0247167 | A1 | 9/2013 | Paul et al. | |
| 2015/0082417 | A1 * | 3/2015 | Bhagwat | H04L 63/0263 726/13 |
| 2015/0105973 | A1 * | 4/2015 | Cicala | G01R 31/007 701/34.4 |
| 2019/0260781 | A1 * | 8/2019 | Fellows | G06F 16/2455 |
| 2019/0394089 | A1 * | 12/2019 | Barrett | H04W 12/088 |
| 2020/0236086 | A1 * | 7/2020 | Patil | G06F 9/45558 |
| 2020/0274851 | A1 * | 8/2020 | Qiao | H04L 63/0263 |

(Continued)

FOREIGN PATENT DOCUMENTS

JP     2020028092 A     2/2022

*Primary Examiner* — Matthew Smithers
(74) *Attorney, Agent, or Firm* — Christopher G. Darrow; Darrow Mustafa PC (57) ABSTRACT

Systems and methods for dynamically updating firewall rules for a vehicle network are disclosed herein. In one example, a system includes a processor and a memory in communication with the processor having a cyber health engine module. The cyber health engine module includes instructions that, when executed by the processor, cause the processor to receive health status information from one or more nodes of the vehicle network, calculate a risk factor for the one or more nodes of the vehicle network based on the health status information, and in response to determining that the risk factor for the one or more nodes of the vehicle network indicates increased risk, update the firewall rules to address the increased risk.

17 Claims, 5 Drawing Sheets

(56) References Cited

U.S. PATENT DOCUMENTS

| | | | |
|---|---|---|---|
| 2021/0026958 A1* | 1/2021 | Filipek | G06F 21/56 |
| 2022/0150218 A1* | 5/2022 | Vanderveen | H04L 63/0263 |
| 2022/0255897 A1* | 8/2022 | Miele | H04L 63/1425 |
| 2023/0262093 A1* | 8/2023 | Gupta | H04L 63/1425 726/1 |
| 2023/0283591 A1* | 9/2023 | Mitchell | H04L 63/029 726/11 |

* cited by examiner

SYSTEM AND METHOD FOR DYNAMICALLY UPDATING FIREWALL RULES FOR A VEHICLE NETWORK OF A VEHICLE

TECHNICAL FIELD

The subject matter described herein generally relates to systems and methods for improving vehicle network security.

BACKGROUND

The background description provided is to present the context of the disclosure generally. Work of the inventor, to the extent it may be described in this background section, and aspects of the description that may not otherwise qualify as prior art at the time of filing are neither expressly nor impliedly admitted as prior art against the present technology.

Most modern vehicles have vehicle networks that interconnect systems and subsystems within the vehicle. For example, some vehicles include brake control systems, throttle control systems, steering control systems, etc., connected to the vehicle network. In addition, some vehicles also include advanced driver assistant systems (ADAS) that can control the brake, throttle, and/or steering systems by communicating with these systems via the vehicle network.

However, vehicle networks can be subject to certain security risks. For example, vehicle networks may be connected to outside systems through either wired or wireless communication methodologies. These outside systems may provide information or computational capabilities to augment the systems and subsystems that form the vehicle network. However, nefarious outside systems may gain access to the vehicle network to either take over control of the vehicle, collect information, cause one or more systems or subsystems to fail, or perform other unintended tasks.

Existing vehicle gateways are known to deploy static firewall rules that prevent the network traffic from one vehicle network segment to another. This is normally deployed by creating an allow list (allowed traffic) or block list (rejected traffic). One major disadvantage of this approach is that an attacker only needs to obtain the allow list or block list information for a successful message spoofing attack. This approach lacks any proactive response in the presence of a known risk or an attack.

SUMMARY

This section generally summarizes the disclosure and is not a comprehensive explanation of its full scope or all its features.

In one embodiment, a system for dynamically updating firewall rules for a vehicle network of a vehicle includes a processor and a memory in communication with the processor. The memory stores instructions that, when executed by the processor, cause the processor to receive health status information from one or more nodes of the vehicle network, calculate a risk factor for the one or more nodes of the vehicle network based on the health status information, and in response to determining that the risk factor for the one or more nodes of the vehicle network indicates increased risk, update the firewall rules to address the increased risk.

In another embodiment, a method for dynamically updating firewall rules for a vehicle network of a vehicle using a cyber-health engine includes the steps of receiving health status information from one or more nodes of the vehicle network and calculating a risk factor for the one or more nodes of the vehicle network based on the health status information. In response to determining that the risk factor for the one or more nodes of the vehicle network indicates increased risk, the method updates the firewall rules to address the increased risk.

In yet another embodiment, a non-transitory computer-readable medium stores instructions for dynamically updating firewall rules for a vehicle network of a vehicle. The instructions, when executed by a processor, cause the processor to receive health status information from one or more nodes of the vehicle network, calculate a risk factor for the one or more nodes of the vehicle network based on the health status information, and in response to determining that the risk factor for the one or more nodes of the vehicle network indicates increased risk, update the firewall rules to address the increased risk.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
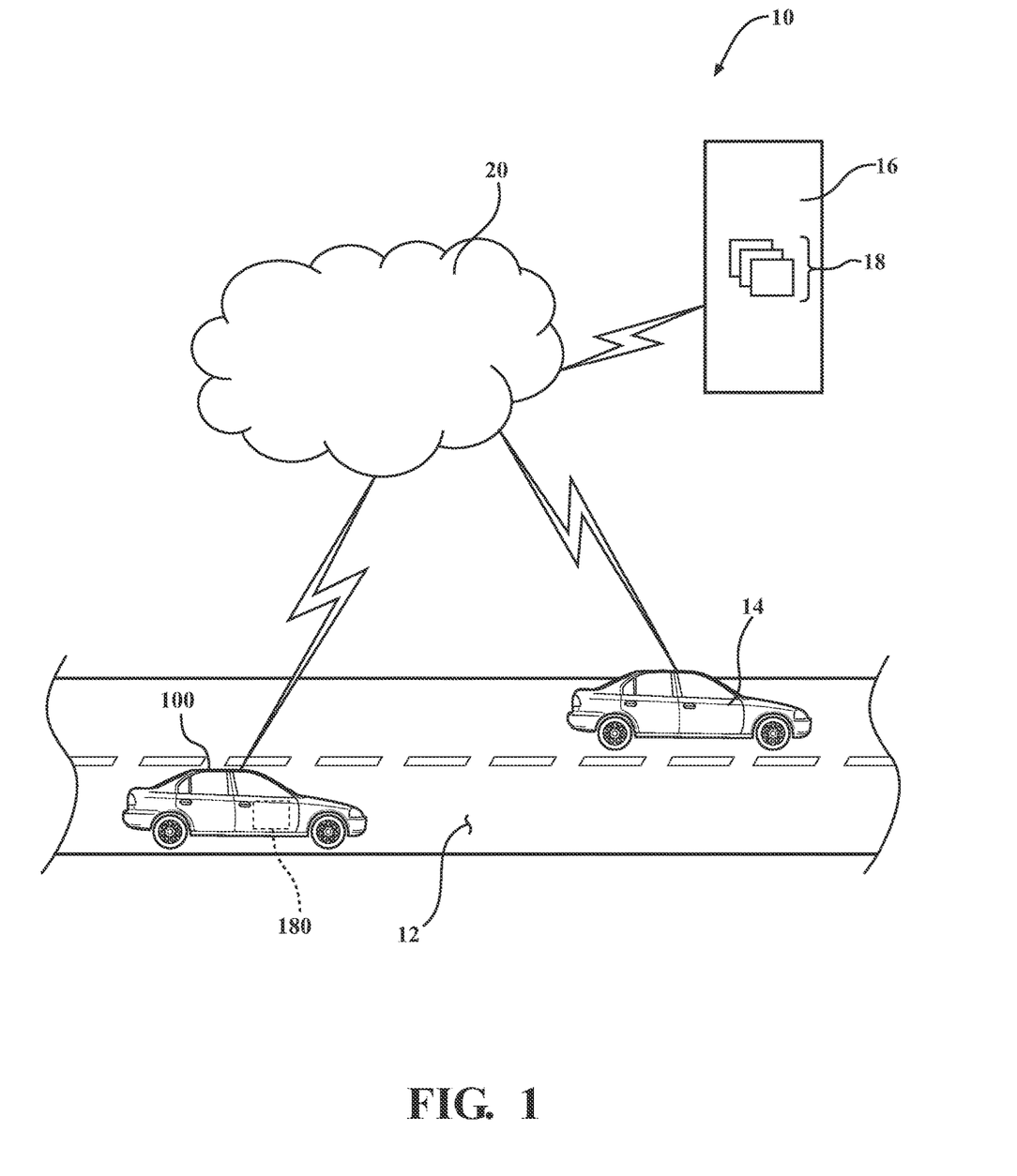
FIG. 1 illustrates an example of an environment having a vehicle with a cyber health engine for dynamically updating firewall rules for a vehicle network of the vehicle.

Referring to FIG. 1, illustrated is an example environment 10 that includes a vehicle 100 traveling on a road 12. The vehicle 100 includes a vehicle network and a cyber health engine 180 that can dynamically update firewall rules of the vehicle network. As will be described in greater detail throughout this description, the cyber health engine 180 requests health status information from the nodes of the vehicle. The cyber health engine 180 calculates a risk factor for each node based on the received health status information. In response to determining that the risk factor for one of the nodes indicates increased risk, the cyber health engine 180 updates the firewall rules to address the increased risk.

In this example, the vehicle 100 can communicate with outside networks, such as the distributed network 20, using a wireless network. The ability to communicate with distributed network 20 allows the vehicle 100, and therefore the vehicle network of the vehicle 100, to communicate with other devices, such as another vehicle 14 and/or a cloud-based server 16. Additionally or alternatively, the vehicle 100 may have the ability to directly communicate with other devices, such as the vehicle 14. As will be explained in greater detail later in this description, the cyber health engine can utilize information from the devices to update the firewall rules of the vehicle network of the vehicle 100. For example, the cyber health engine 180 may receive security updates 18 from a cloud-based server 16 and utilize the security updates 18 to calculate the risk of the systems and, if necessary, change the firewall rules of the vehicle network of the vehicle 100.

Again, the example described in the paragraph above is merely an example. In some cases, the vehicle 100 may not have the ability to communicate with outside devices. Further still, in other cases, the vehicle 100 may have the ability to communicate with numerous outside devices, such as vehicles and cloud-based servers mentioned before, but also have the ability to communicate with mobile devices, roadside units, or any other device capable of sending and/or receiving electronic information.

Figure 2:
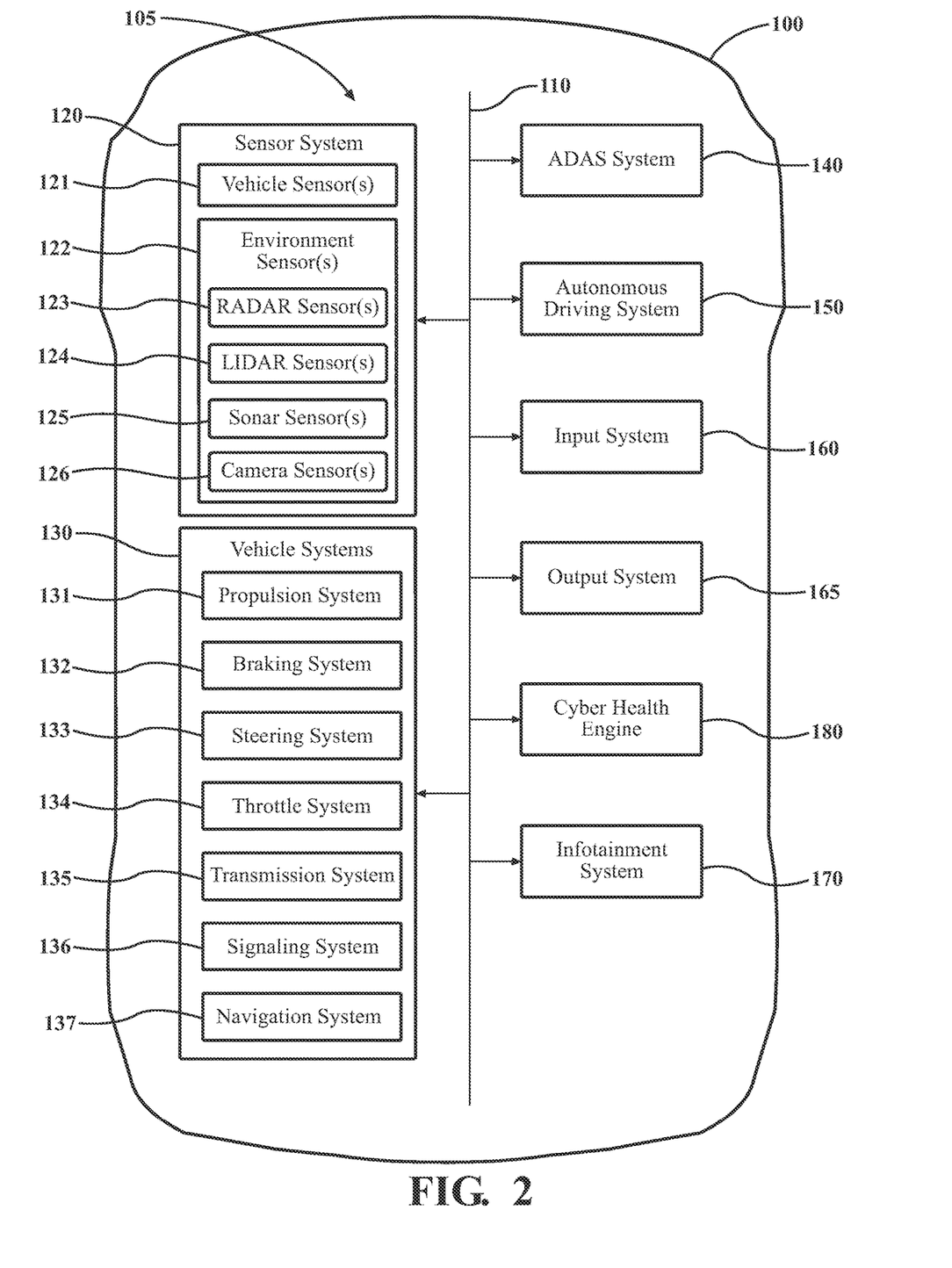
FIG. 2 illustrates a block diagram of the vehicle of FIG. 1 incorporating the cyber health engine.

Referring to FIG. 2, an example of the vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport.

The vehicle 100 also includes various elements. It will be understood that in various embodiments it may not be necessary for the vehicle 100 to have all of the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 2, it will be understood that one or more of these elements can be located external to the vehicle 100. Further, the elements shown may be physically separated by large distances and provided as remote services (e.g., cloud-computing services).

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a vehicle network 105 that may include several of the components shown in FIG. 2. For example, the vehicle network 105 may include a bus 110 for connecting various nodes of the vehicle network 105 so that the nodes can communicate with each other. The bus 110 can be a single bus or multiple buses that can communicate physically or virtually with each other. The bus 110 can utilize any appropriate protocol for the vehicle network 105, such as Controller Area Network (CAN), Local Interconnect Network (LIN), Automotive Ethernet (IEEE 802.3), Data Distribution Service (DDS), Message Queuing Telemetry Transport (MQTT), Desktop Bus (D-Bus), or any other networking protocols.

The bus 110 allows different components connected to the bus, sometimes referred to as nodes, to communicate with each other by sending and receiving information via the bus 110 of the vehicle network 105. As explained previously, the components making up the vehicle 100 can vary from application to application. As such, the components that form the nodes of the vehicle network 105 are merely examples. Alternative components or additional components may be utilized that form separate nodes.

In this example, the vehicle 100 includes a sensor system 120, a vehicle system 130, an ADAS system 140, an autonomous driving system 150, an input system 160, an output system 165, an infotainment system 170, and the cyber health engine 180. Each system essentially forms separate nodes that form the vehicle network 105. Again, as mentioned previously, the nodes provided in this example may change from application to application. For example, if the vehicle does not have autonomous driving capabilities, the vehicle may disable or not include the autonomous driving system 150 as a node.

Before describing the capabilities of the cyber health engine 180, a brief description of the various nodes forming the vehicle network 105 will be given. As noted above, the vehicle 100 can include a node in the form of the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to another element of the vehicle 100 (including any of the elements shown in FIG. 2). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

For example, in one or more arrangements, the sensor system 120 can include one or more radar sensors 123, one or more LIDAR sensors 124, one or more sonar sensors 125, and/or cameras 126. In one or more arrangements, the one or more cameras 126 can be high dynamic range (HDR) cameras or infrared (IR) cameras.

The vehicle 100 can include one or more vehicle systems 130 also acting as nodes of the vehicle network 105. Various examples of the one or more vehicle systems 130 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 131, a braking system 132, a steering system 133, a throttle system 134, a transmission system 135, a signaling system 136, and/or a navigation system 137. Each of these systems can include one or more devices, components, and/or a combination thereof, now known or later developed.

The navigation system 137 can include one or more devices, applications, and/or combinations thereof, now known or later developed, configured to determine the geographic location of the vehicle 100 and/or to determine a travel route for the vehicle 100. The navigation system 137 can include one or more mapping applications to determine a travel route for the vehicle 100. The navigation system 137 can include a global positioning system, a local positioning system, or a geolocation system.

The ADAS system 140 can include any group of electronic technologies that assist drivers and driving parking functions. For example, the ADAS system 140 can receive information from the sensor system 120 and, based on that information, control one of the various vehicle systems 130 and/or other systems. Examples of systems and subsystems that form the ADAS system 140 can include blind spot monitoring systems, forward collision warning systems, lane departure warning systems, adaptive cruise control, antilock braking systems, automatic parking systems, collision avoidance systems, electronic stability control systems, hill descent control systems, and the like.

The autonomous driving system 150 can be operatively connected to communicate with the various vehicle systems 130 and/or individual components thereof via the vehicle network 105. For example, the autonomous driving system 150 can be in communication to send and/or receive information from the various vehicle systems 130 to control the movement, speed, maneuvering, heading, direction, etc. of the vehicle 100. The autonomous driving system 150 may control some or all of these vehicle systems 130 and, thus, may be partially or fully autonomous.

The vehicle 100 can include an input system 160. An "input system" includes any device, component, system, element or arrangement or groups thereof that enable information/data to be entered into a machine. The input system 160 can receive an input from a vehicle passenger (e.g., a driver or a passenger). The vehicle 100 can include an output system 165. An "output system" includes any device, component, arrangement, or group that enables information/data to be presented to a vehicle passenger (e.g., a person, a vehicle passenger, etc.).

The infotainment system 170 may include various systems and subsystems designed to deliver information and entertainment by the output system 165 and/or receive input from the input system 160. For example, the infotainment system 170 may provide audible and/or visual entertainment/information to one or more occupants of the vehicle 100.

As mentioned before, the cyber health engine 180 can dynamically update firewall rules for the vehicle network 105. Briefly, cyber health engine 180 requests health status information from the nodes of the vehicle. As mentioned before, these nodes can include any of the components connected that form the vehicle network 105, such as the sensor system 120, vehicle systems 130, the ADAS system 140, the autonomous driving system 150, the input system 160, the output system 165, and/or the infotainment system 170. The cyber health engine 180 calculates a risk factor for each node based on the received health status information. In response to determining that the risk factor for one of the nodes indicates increased risk, the cyber health engine 180 updates the firewall rules to address the increased risk.

Figure 3:
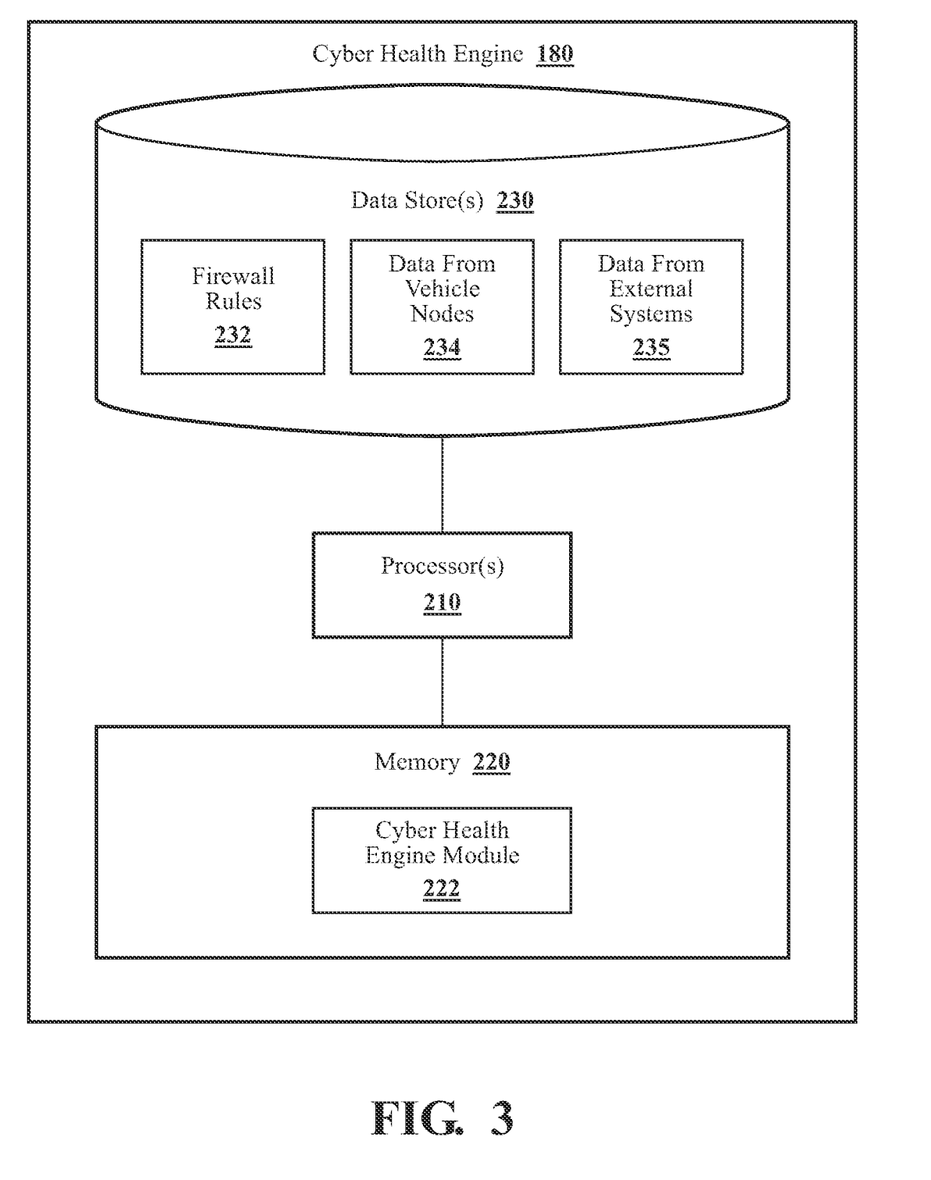
FIG. 3 illustrates a more detailed view of the cyber health engine.

With reference to FIG. 3, one embodiment of the cyber health engine 180 is further illustrated. As shown, the cyber health engine 180 includes one or more processor(s) 210. Accordingly, the processor(s) 210 may be a part of the cyber health engine 180 or the cyber health engine 180 may access the processor(s) 210 through a data bus or another communication path. In one or more embodiments, the processor(s) 210 is an application-specific integrated circuit that is configured to implement functions associated with a cyber health engine module 222. In general, the processor(s) 210 is an electronic processor such as a microprocessor capable of performing various functions described herein.

In one embodiment, the cyber health engine 180 includes a memory 220 that stores the cyber health engine module 222. The memory 220 is a random-access memory (RAM), read-only memory (ROM), a hard disk drive, a flash memory, or other suitable memory for storing the cyber health engine module 222. The cyber health engine module 222 is, for example, computer-readable instructions that, when executed by the processor(s) 210, cause the processor(s) 210 to perform the various functions disclosed herein.

Furthermore, in one embodiment, the cyber health engine 180 includes one or more data store(s) 230. The data store(s) 230 is, in one embodiment, an electronic data structure such as a database that is stored in the memory 220 or another memory and that is configured with routines that can be executed by the processor(s) 210 for analyzing stored data, providing stored data, organizing stored data, and so on.

Thus, in one embodiment, the data store(s) 230 stores data used by the cyber health engine module 222 in executing various functions.

In one embodiment, the data store(s) 230 include firewall rules 232, data from vehicle nodes 234, and/or data from external systems 235, along with, for example, other information that is used by the cyber health engine module 222. The firewall rules 232 are instructions or policies that determine what traffic is allowed and/or blocked on the vehicle network 105. The firewall rules 232 may examine the control information in individual packets and either block or allow them according to criteria set by the cyber health engine. The firewall rules 232 can control how firewalls protect the vehicle network 105 from malicious programs and/or unauthorized access.

Based on the firewall rules 232, the cyber health engine module 222 can cause the processor(s) 210 to perform a number of different functions to protect the vehicle network from malicious programs and/or unauthorized access. In one example, these functions can include updating a blocklist and/or allow list of the vehicle network 105, blocking all messages coming from one of the nodes of the vehicle network 105, blocking a subset of messages coming from one of the nodes based on criticality, sending rebooting commands to one of the nodes, sending an update request to one of the nodes, sending a request for reauthentication, terminating an established session, flooding one of the nodes with error messages, and/or disconnecting one of the nodes from the vehicle network 105.

The data from vehicle nodes 234 can include information from one of the nodes of the vehicle network 105. In one example, the data from vehicle nodes 234 can include health status information from one of the vehicle nodes. Health status information can include a list of verified software components running on the nodes, execution context or memory values of one or more processes on the nodes, external interfaces connected to the nodes, the last configuration of the nodes, anomalies detected by the nodes, and/or bill of material of the nodes.

The data from external systems 235 can be security-related data from an external device, such as the vehicle 14 and/or the cloud-based server 16, shown in FIG. 1. This information may be similar to the health information and may include information regarding any of the nodes of the vehicle network 105 or other security-related information. For example, the data from external systems 235 could include recently updated security vulnerabilities that may affect one or more systems that form one of the nodes of the vehicle network 105.

The cyber health engine module 222 generally includes instructions that function to control the processor(s) 210 to dynamically update the firewall rules 232 for the vehicle network 105. In one example, the cyber health engine module 222 includes instructions that cause the processor(s) 210 to request health status information from one or more nodes of the vehicle network 105. As explained previously, these nodes can vary significantly from application to application. In this example, the nodes include any of the components connected that form the vehicle network 105, such as the sensor system 120, vehicle systems 130, the ADAS system 140, the autonomous driving system 150, the input system 160, the output system 165, and/or the infotainment system 170.

Requesting the health status information from one or more vehicle nodes may be performed at any time the vehicle network 105 is functioning. In one example, requesting the health status information may occur upon booting one or more systems or subsystems that form the vehicle network 105, and/or after observing an anomaly and/or security vulnerability by either the cyber health engine 180 or another node that forms the vehicle network 105.

In response to the request, the cyber health engine module 222 causes the processor(s) 210 to receive health status information from the nodes of the vehicle network 105. As explained previously, the health status information may be stored in the data store(s) 230 as data from vehicle nodes 234. Health status information may include a list of software running on the nodes (which may include digital signatures and version information), external interfaces connected to the nodes, the last configuration of the nodes, anomalies detected by the nodes, and/or bill of material of the nodes.

In some cases, the nodes that form the vehicle network 105 may be able to detect network-related and/or node-specific threats and provide this threat information to the processor(s) 210 when providing the health status information. Essentially, some nodes may be able to proactively and iteratively search to detect and isolate advanced threats that evade existing security solutions. These threat detection systems may be analytics-driven, situational awareness driven, and/or intelligence-driven. In addition to threats, the nodes may also be able to provide vulnerability information as part of the health status information, which may relate to the flaws in the nodes that malicious actors can exploit.

Upon receiving health status information from one or more nodes of the vehicle network 105, the cyber health engine module 222 may include instructions that cause the processor(s) 210 to calculate a risk factor for the nodes of the vehicle network based on the health status information received from each node. The risk factor is specific for each node of the vehicle network 105 and can be utilized to indicate the risk level that each node is to the safety and stability of the vehicle network 105. The risk factor can essentially be a value indicative of the risk factor a node presents to the vehicle network 105, based on elements such as vulnerabilities, new zero-day exploits, unrecognized third-party software, risky externally faced interfaces, and the like. For example, if one particular node has a known vulnerability, the risk factor for that particular node may be higher than the risk factor for another node with no known vulnerability. In like manner, if one node detects a threat, that node may have a higher risk factor than another node with no known threat. Again, the risk factor is based on the health status information from each node and can be weighted accordingly.

In response to determining the risk factor indicating an increased risk, the cyber health engine module 222 may include instructions that cause the processor(s) 210 to update the firewall rules 232 to address the increased risk. As mentioned before, the risk factor may be a specified, calculated, or derived value. This value may be compared to a threshold value. If the risk factor value exceeds the threshold value, the cyber health engine module 222 may cause the processor(s) 210 to update the firewall rules 232 accordingly.

As mentioned before, the firewall rules 232 are instructions or policies that determine what traffic is allowed and/or blocked on the vehicle network 105. Based on the determination that the risk factor exceeds a threshold value, the changing/updating of the firewall rules 232 can include updating a block list and/or an allow list of the vehicle network 105, blocking all messages coming from one of the nodes of the vehicle network 105, blocking a subset of messages coming from one of the nodes based on criticality, sending rebooting commands to one of the nodes, sending an update request to one of the nodes, flooding one of the nodes with error messages, and/or disconnecting one of the nodes from the vehicle network 105.

As such, the cyber health engine 180 can provide a proactive cyber defense by deploying dynamic firewall rules that adjust to the risk of the vehicle network 105 and attacks observed. As a result, vulnerable systems can reduce the efficacy of an active attack while waiting for remediation or reducing the efficacy of an active attack.

Figure 4:
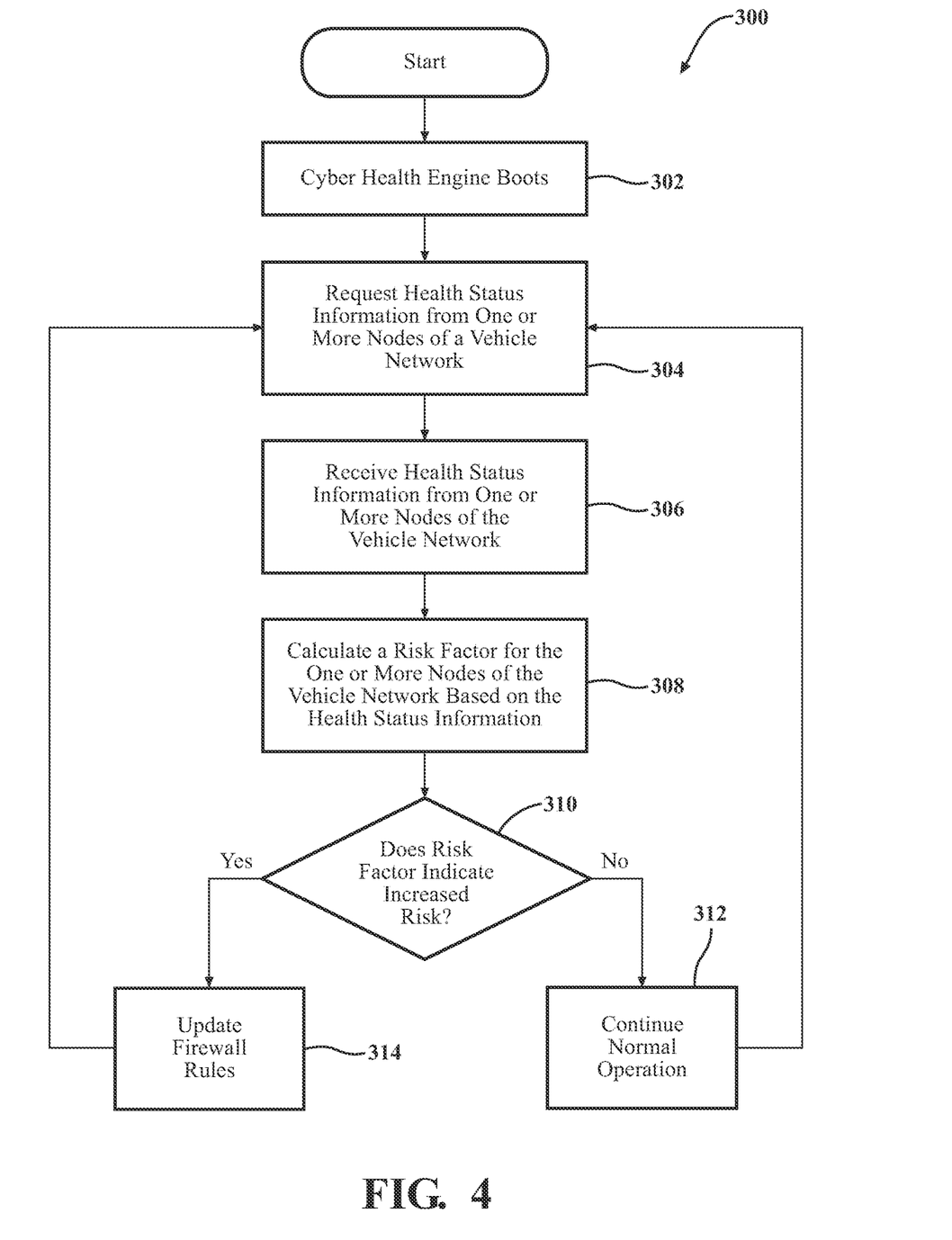
FIG. 4 illustrates a method for dynamically updating firewall rules for a vehicle network of the vehicle.

Referring to FIG. 4, a method 300 for dynamically updating firewall rules for a vehicle network is shown. The method 300 will be described from the viewpoint of the vehicle 100 of FIG. 2 and the cyber health engine 180 of FIG. 2. However, it should be understood that this is just one example of implementing the method 300. While method 300 is discussed in combination with the cyber health engine 180, it should be appreciated that the method 300 is not limited to being implemented within the cyber health engine 180 but is instead one example of a system that may implement the method 300.

In step 302, the cyber health engine 180 boots. The building of the cyber health engine 180 may occur with the powering on of the vehicle 100 or may occur in response to a detected threat or another occurrence.

In step 304, the cyber health engine module 222 includes instructions that cause the processor(s) 210 to request health status information from one or more nodes of the vehicle network 105. As explained previously, these nodes can vary significantly from application to application. In this example, the nodes include any of the components connected that form the vehicle network 105, such as the sensor system 120, vehicle systems 130, the ADAS system 140, the autonomous driving system 150, the input system 160, the output system 165, and/or the infotainment system 170. Health status information can include a list of software running on the nodes, external interfaces connected to the nodes, the last configuration of the nodes, anomalies detected by the nodes, and/or bill of material of the nodes. In step 306, the cyber health engine module 222 includes instructions that cause the processor(s) 210 to receive the health status information requested in step 304.

In step 308, the cyber health engine module 222 includes instructions that cause the processor(s) 210 to calculate a risk factor for the nodes of the vehicle network based on the health status information received from each node. As explained before, the risk factor is specific for each node of the vehicle network 105 and can be utilized to indicate the risk level that each node is to the safety and stability of the vehicle network 105. The risk factor can essentially be a value indicative of the risk factor a node presents to the vehicle network 105, such as vulnerabilities, new zero-day exploits, unrecognized third-party software, risky externally faced interfaces, and the like.

In step 310, the cyber health engine module 222 includes instructions that cause the processor(s) 210 to determine if the risk factor indicates an increased risk to the vehicle network 105. In one example, as explained earlier, the risk factor may be compared to a threshold value.

If it is determined in step 310 that the risk factor does not indicate an increased risk, the method 300 proceeds to step 312, wherein the firewall rules 232 are not updated, and the nodes and/or the vehicle network 105 continues operation without changes. Conversely, if the risk factor indicates an increased risk, the method 300 proceeds to step 314, wherein the cyber health engine module 222 includes instructions that cause the processor(s) 210 to update the firewall rules 232. The changing/updating of the firewall rules 232 can include updating an allow list and/or block list of the vehicle network 105, blocking all messages coming from one of the nodes of the vehicle network 105, blocking a subset of messages coming from one of the nodes based on criticality, sending rebooting commands to one of the nodes, sending an update request to one of the nodes, flooding one of the nodes with error messages, and/or disconnecting one of the nodes from the vehicle network 105.

Figure 5:
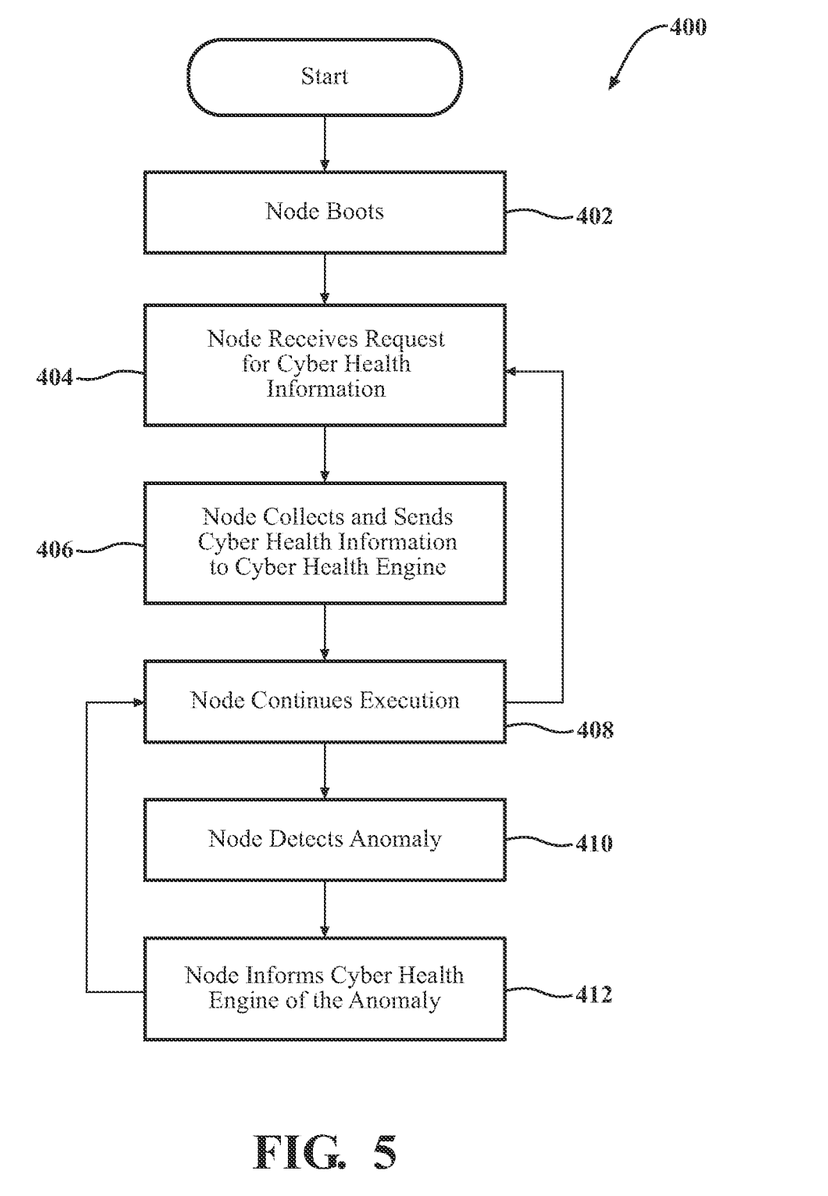
FIG. 5 illustrates a method for a node to interact with the cyber health engine.

The method 300 of FIG. 4 illustrates the operation of the cyber health engine 180 from the viewpoint of the cyber health engine 180. FIG. 5 illustrates a method 400 indicating actions of one of the nodes interacting with the cyber health engine 180. As mentioned before, the nodes can include any system that forms part of the vehicle network 105. In step 402, the node becomes operational, which may be caused by the turning on of the vehicle 100.

In step 404, the node receives a request for cyber health information from the cyber health engine 180. The cyber health information can be any of the previously described cyber health information in this description. Also, as previously mentioned, the cyber health information can include threat detection or vulnerability detection performed by the particular node. As such, in step 406, the node collects and sends over the cyber health information to the cyber health engine 180.

After responding to the request for cyber health information from the cyber health engine 180, the node continues operation, as indicated in step 408. If the node detects an anomaly, such as in step 410, the node can inform the cyber health engine 180 of the anomaly, as done in step 412. As mentioned before, some nodes may be able to proactively and iteratively search to detect and isolate advanced threats that evade existing security solutions. These threat detection systems may be analytics-driven, situational awareness driven, and/or intelligence-driven. In addition to threats, the nodes may also be able to provide vulnerability information as part of the health status information, which may relate to the flaws in the nodes that malicious actors can exploit. Thereafter, the node continues operation as indicated in step 408.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for dynamically updating firewall rules for a vehicle network, the system comprising:
 a processor; and
 a memory in communication with the processor, the memory having a cyber health engine module including instructions that, when executed by the processor, cause the processor to:
 request health status information from one or more nodes of the vehicle network when at least one of the following occurs: booting of the system, periodically determined by timer and/or event, and after observing an anomaly by the system or any other intrusion detection system,
 receive the health status information from the one or more nodes of the vehicle network,
 calculate a risk factor for the one or more nodes of the vehicle network based on the health status information, and
 in response to determining that the risk factor for the one or more nodes of the vehicle network indicates increased risk, update the firewall rules to address the increased risk.

2. The system of claim 1, wherein the health status information includes one or more of:
 a list of software running on the one or more nodes;
 external interfaces connected to the one or more nodes;
 last configuration for the one or more nodes;

anomalies detected by the one or more nodes; and
a bill of material for the one or more nodes.

3. The system of claim 1, wherein the cyber health engine module further includes instructions that, when executed by the processor, cause the processor to calculate the risk factor for the one or more nodes of the vehicle network by comparing the health status information to threat information, the threat information having information related to capabilities of the node to affect vehicle network and/or information related to network-related threats.

4. The system of claim 3, wherein the threat information originated from at least one of the following:
a cloud-based server;
another vehicle; and
a security vulnerability identified by one or more nodes of the vehicle.

5. The system of claim 1, wherein the cyber health engine module further includes instructions that, when executed by the processor, cause the processor to:
update a block list and/or an allow list of the vehicle network;
block all messages coming from the one or more nodes;
block a subset of the messages coming from the one or more nodes based on criticality;
send rebooting commands to the one or more nodes;
send an update request to the one or more nodes;
flood the one or more nodes with error messages; and
disconnect the one or more nodes from the vehicle network.

6. The system of claim 1, wherein the cyber health engine module further includes instructions that, when executed by the processor, cause the processor to:
compare the risk factor to a threshold factor; and
determine that the risk factor indicates increased risk when the risk factor exceeds the threshold factor.

7. A method for dynamically updating firewall rules for a vehicle network of a vehicle using a cyber-health engine, the method comprising steps of:
requesting health status information from one or more nodes of the vehicle network when at least one of the following occurs: booting of a system, periodically determined by timer and/or event, and after observing an anomaly by the system or any other intrusion detection system;
receiving the health status information from the one or more nodes of the vehicle network;
calculating a risk factor for the one or more nodes of the vehicle network based on the health status information; and
in response to determining that the risk factor for the one or more nodes of the vehicle network indicates increased risk, updating the firewall rules to address the increased risk.

8. The method of claim 7, wherein the health status information includes one or more of:
a list of software running on the one or more nodes;
external interfaces connected to the one or more nodes;
last configuration for the one or more nodes;
anomalies detected by the one or more nodes; and
a bill of material for the one or more nodes.

9. The method of claim 7, further comprising the step of calculating the risk factor for the one or more nodes of the vehicle network by comparing the health status information to threat information, the threat information having information related to capabilities of the node to affect the vehicle network and/or information related to network-related threats.

10. The method of claim 9, wherein the threat information originated from at least one of the following:
a cloud-based server;
another vehicle; and
a security vulnerability identified by one or more nodes of the vehicle.

11. The method of claim 7, wherein the step of updating the firewall rules includes at least one of the following:
updating a block list and/or an allow list of the vehicle network;
blocking all messages coming from the one or more nodes;
blocking a subset of the messages coming from the one or more nodes based on criticality;
sending rebooting commands to the one or more nodes;
sending an update request to the one or more nodes;
flooding the one or more nodes with error messages; and
disconnecting the one or more nodes from the vehicle network.

12. The method of claim 7, further comprising the steps of:
comparing the risk factor to a threshold factor; and
determining that the risk factor indicates increased risk when the risk factor exceeds the threshold factor.

13. A non-transitory computer-readable medium storing instructions for dynamically updating firewall rules for a vehicle network of a vehicle, the instructions, when executed by a processor, cause the processor to:
request health status information from one or more nodes of the vehicle network when at least one of the following occurs: booting of a system, periodically determined by timer and/or event, and after observing an anomaly by the system or any other intrusion detection system,
receive the health status information from the one or more nodes of the vehicle network,
calculate a risk factor for the one or more nodes of the vehicle network based on the health status information, and
in response to determining that the risk factor for the one or more nodes of the vehicle network indicates increased risk, update the firewall rules to address the increased risk.

14. The non-transitory computer-readable medium of claim 13, wherein the health status information includes one or more of:
a list of software running on the one or more nodes;
external interfaces connected to the one or more nodes;
last configuration for the one or more nodes;
anomalies detected by the one or more nodes; and
a bill of material for the one or more nodes.

15. The non-transitory computer-readable medium of claim 13, further comprising instructions that, when executed by the processor, cause the processor to calculate the risk factor for the one or more nodes of the vehicle network by comparing the health status information to threat information, the threat information having information related to capabilities of the node to affect the vehicle network and/or information related to network-related threats.

16. The non-transitory computer-readable medium of claim 15, wherein the threat information originated from at least one of the following:
a cloud-based server;
another vehicle; and
a security vulnerability identified by one or more nodes of the vehicle.

17. The non-transitory computer-readable medium of claim 13, further comprising instructions that, when executed by the processor, cause the processor to:
    update a block list and/or allow list of the vehicle network;
    block all messages coming from the one or more nodes;
    block a subset of the messages coming from the one or more nodes based on criticality;
    send rebooting commands to the one or more nodes;
    send an update request to the one or more nodes;
    flood the one or more nodes with error messages;
    and disconnect the one or more nodes from the vehicle network.

\* \* \* \* \*